United States Patent
Cogan

[11] Patent Number: 6,116,130
[45] Date of Patent: Sep. 12, 2000

[54] CUTTING HEAD ASSEMBLY WITH REPLACEABLE BLADE

[75] Inventor: Kevin C. Cogan, Carrollton, Tex.

[73] Assignee: Recot, Inc., Pleasanton, Calif.

[21] Appl. No.: 08/996,019

[22] Filed: Dec. 22, 1997

Related U.S. Application Data

[62] Division of application No. 08/707,898, Sep. 12, 1996, Pat. No. 5,819,628, which is a division of application No. 08/151,472, Nov. 12, 1993, Pat. No. 5,555,787.

[51] Int. Cl.[7] .................................. B26D 3/28; B26D 7/26
[52] U.S. Cl. ...................... 83/403; 83/404.3; 83/698.11; 83/856; 83/932
[58] Field of Search ................................ 83/404.1, 404.3, 83/698.11, 699.51, 699.61, 703, 856, 857, 858, 915.5, 932, 356.3, 403, 698.41, 698.42, 698.51, 698.61

[56] References Cited

U.S. PATENT DOCUMENTS

| | | | |
|---|---|---|---|
| 2,643,579 | 6/1953 | Jacoby, Jr. | 83/915.5 X |
| 2,662,445 | 12/1953 | Jacoby, Jr. | 83/915.5 X |
| 2,934,117 | 4/1960 | Urschel et al. | 83/403 |
| 2,961,024 | 11/1960 | Urschel et al. | 83/403 |
| 3,935,774 | 2/1976 | Craddy | 83/698.51 X |
| 4,077,450 | 3/1978 | Ackerman | 241/93 X |
| 4,373,678 | 2/1983 | Reitter | 241/294 X |
| 4,523,503 | 6/1985 | Julian et al. | 83/404.3 X |
| 4,739,939 | 4/1988 | Panning | 241/294 |
| 4,976,471 | 12/1990 | Holgersson | 241/294 X |
| 5,555,787 | 9/1996 | Barber et al. | 83/404.3 X |
| 5,694,824 | 12/1997 | Jacko et al. | 83/858 X |

*Primary Examiner*—Clark F. Dexter
*Attorney, Agent, or Firm*—Jones, Day, Reavis & Pogue

[57] ABSTRACT

The present invention discloses a replaceable blade cartridge and a compatible assembly for holding the cartridge wherein an old blade cartridge is slidably removed from the holding assembly and a new blade is slidably inserted into the holding assembly. Specifically, a replaceable blade cartridge for use in a compatible cutting head assembly of a centrifugal type slicer is disclosed.

1 Claim, 6 Drawing Sheets

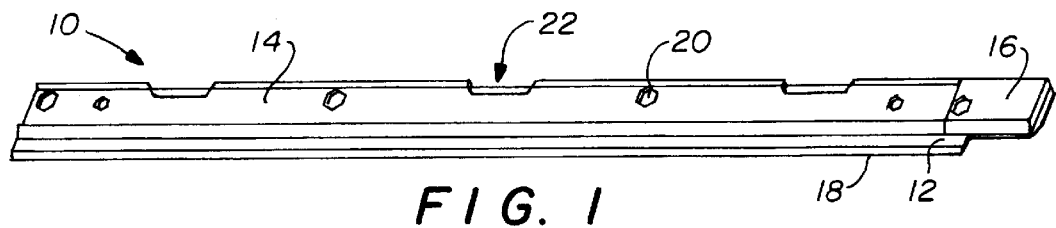
FIG. 1
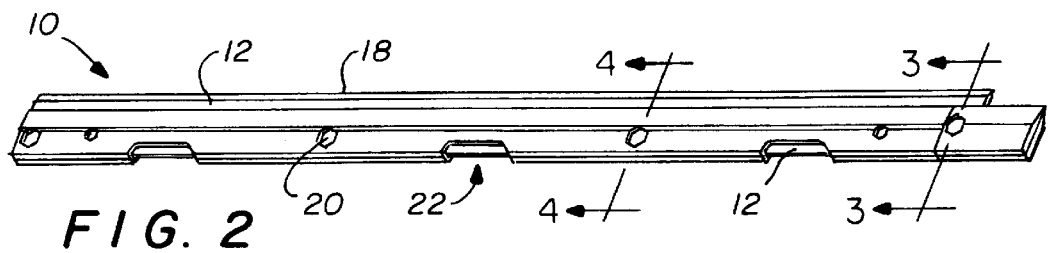
FIG. 2
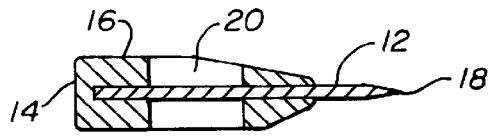
FIG. 3
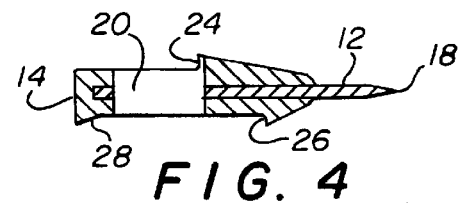
FIG. 4
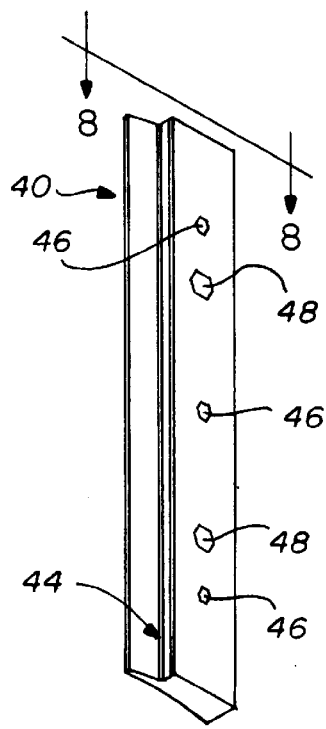
FIG. 6    FIG. 7
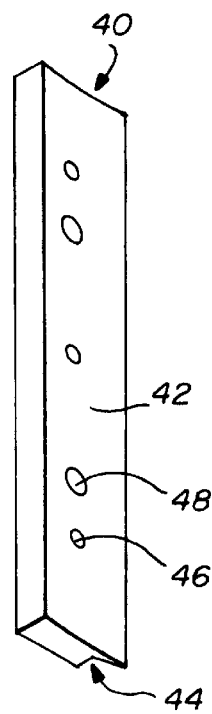
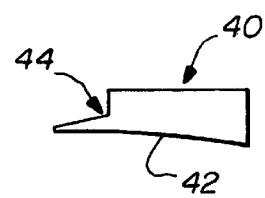
FIG. 8

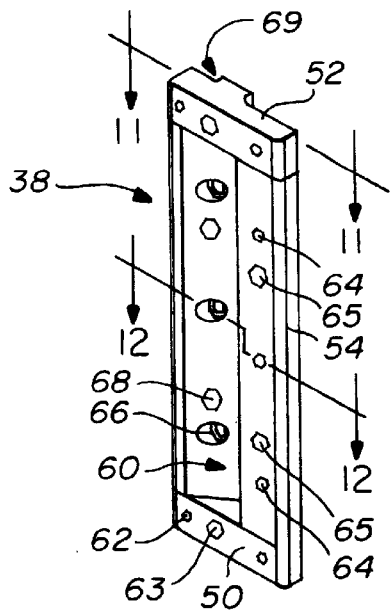 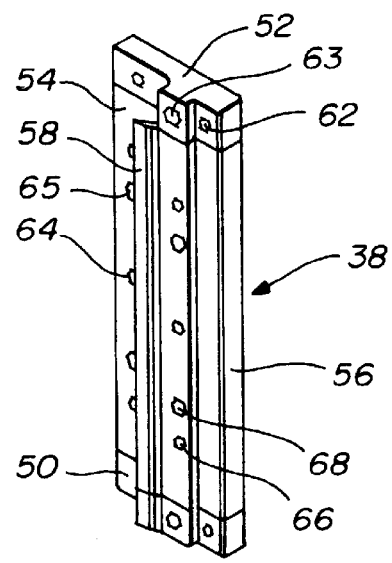 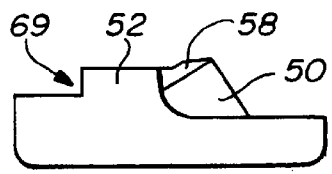 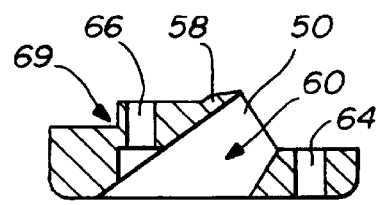 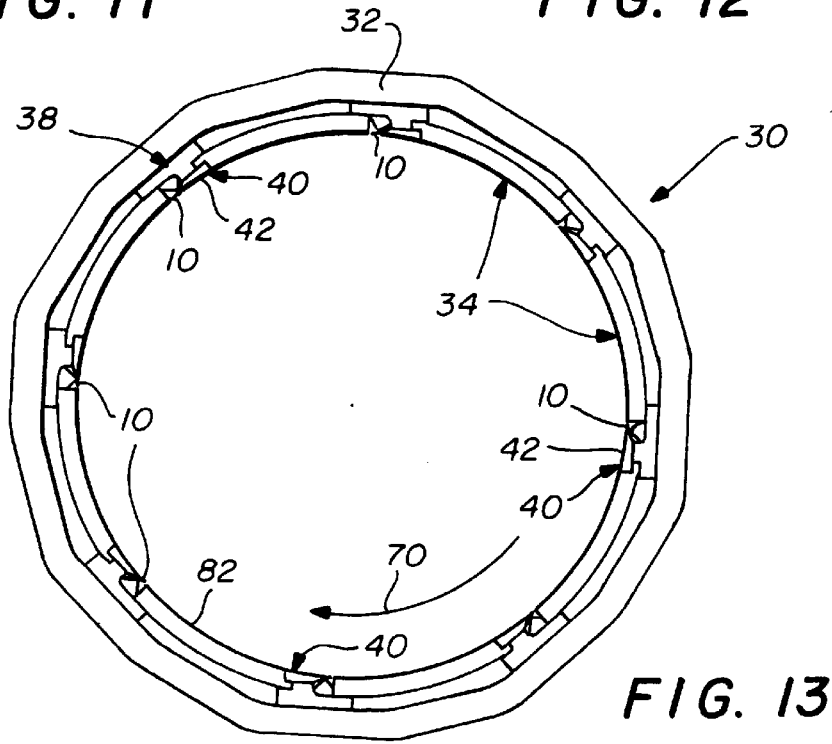
FIG. 9
FIG. 10
FIG. 11
FIG. 12
FIG. 13

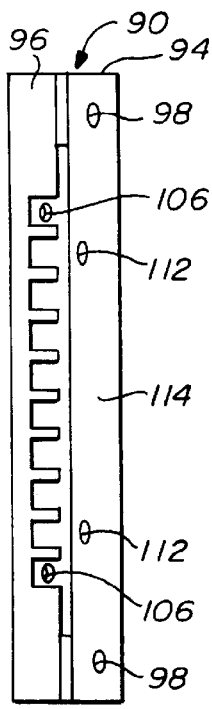
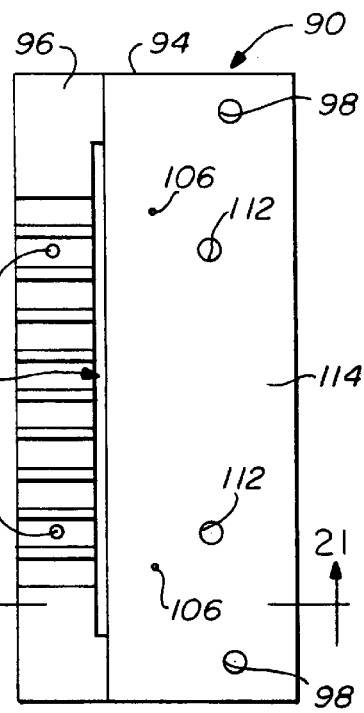
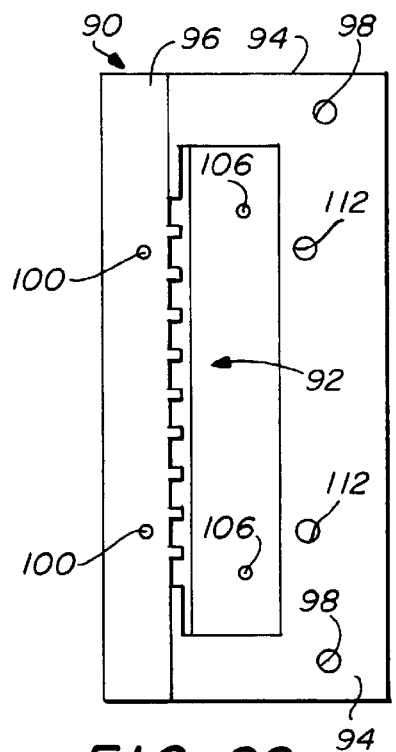
FIG. 19    FIG. 18    FIG. 20
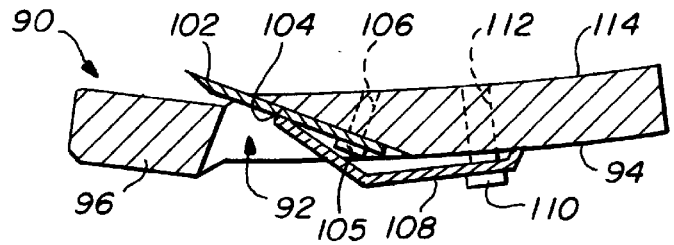
FIG. 21
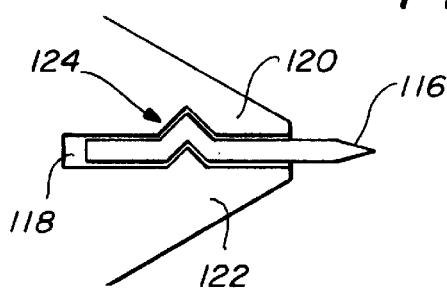
FIG. 22
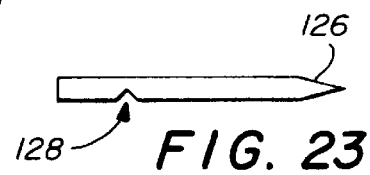
FIG. 23
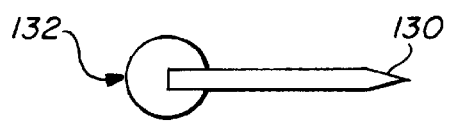
FIG. 24
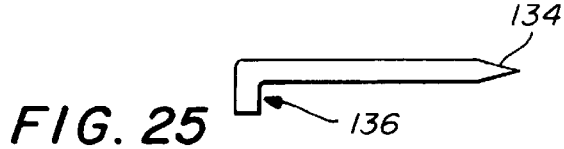
FIG. 25

CUTTING HEAD ASSEMBLY WITH REPLACEABLE BLADE

This is a divisional of application Ser. No. 08/707,898 filed on Sep. 12, 1996, now Pat. No. 5,819,628, which is a division of Ser. No. 08/151,472 filed on Nov. 12, 1993, now Pat. No. 5,555,787.

BACKGROUND OF THE INVENTION

1. Field of the Invention

The present invention relates generally to centrifugal type slicing apparatus. More specifically the present invention relates to a replaceable blade cartridge for use in a centrifugal type slicer, especially for slicing potatoes, wherein one cartridge may be slidably removed from a cutting head assembly and a new cartridge slidably inserted into the cutting head assembly.

2. Description of Related Art

The commercial process of processing vegetables, nuts, and fruit requires sized reduction of large volumes of food stuffs. The present invention will be described in terms of slicing potatoes to make potato chips. However, as those skilled in the art will appreciate, the present invention can be employed for a wide variety of uses such as shredding or producing a variety of geometrical shapes. Various machines have been developed to accomplish the potato slicing.

One such machine is a centrifugal type slicer, such as the Urschell Model CC Slicer, manufactured by Urschell Laboratories, Inc. In this slicer an impeller with inwardly extending partitions is rotated and potatoes are placed in the impeller. The centrifugal force created by the rotating impeller forces the potatoes outwardly against the partitions and a cutting head surrounding the impeller. The cutting head is generally cylindrical shaped and includes a series of related cutting blades spaced around the cutting head and separated by curved supporting walls, commonly referred to as shoes.

A typical cutting head includes eight shoes and blades and is fitted onto the slicer by a series of locating pins. Each shoe holds a cutting blade and has a pivoting pin that is inserted into a corresponding hole on a retaining ring. The shoes are then rotatable about this pivoting pin and are attached to the ring by a screw.

In use a blade becomes dull and needs frequent replacement. Therefore, each typical head requires that eight blades be replaced many times during operation and typically there are multiple heads feeding subsequent processing units. To replace the blades, the head must be lifted from the slicer and turned over so that the head rests on the retaining ring. Next, bolts on a blade clamp are loosened or removed to allow the blade to be removed from the blade holder. After a new blade is inserted and the blade clamp tightened to hold the blade in place each shoe must be adjusted relative to its two adjacent shoes. This adjustment is necessary in order to maintain a constant predetermined slice thickness.

The adjustment is made by first loosening the screw holding the shoe to the ring to allow the shoe to be pivoted. Next, a setting gauge measures the gap between the new blade and the adjacent shoe. This gap determines the thickness of each potato slice and ideally should be maintained at uniform spacing. This gap is not always set to the same thickness because different density potatoes need to be set at different gap thicknesses. If the potatoes are "heavy", i.e. contain less water, the gap needs to be narrower than for less heavy potatoes because the slices will shrink less than "lighter" slices. Also, the operator must allow for a fluctuation in the gap thickness when he tightens down each shoe. A skilled operator may have to make up to 10 gap adjustments for an eight blade cutting head, before the proper gap tolerances are achieved, and those less skilled may have to make more.

Therefore, it can be seen that it is time consuming and difficult to set the gaps in the cutting head. It can take a skilled operator as much as ten minutes to change blades and adjust the gap thickness on a single cutting head.

Due to the pivoting feature of the shoes there is a certain amount of movement and give in the shoes. This results in uncontrollable variability in the slice thickness of the potatoes. Wear at the junction of the pivoting pin and the hole in the retaining ring results in the shoes being movable within the cutting head assembly and introduces an even greater amount of variability in slice thickness. When a potato contacts a shoe during slicing the potato may cause one or more of the cutting shoes to move resulting in a potato slice which is not within an acceptable range of thickness.

Another problem is encountered because the shoes are connected to only one retaining ring on one side of the shoe. When the pivot junction begins to wear this may result in a non-uniform gap thickness from the retaining ring to a point opposite the ring. This is highly undesirable in a commercial setting where a uniform potato slice is necessary to maintain a high level of quality control in the end product—potato chips.

SUMMARY OF THE INVENTION

It is therefore an object of the present invention to provide a replaceable blade cartridge wherein the cartridge can be replaced without the use of any tools.

It is another object to provide a cartridge that is compatible with a cutting head assembly such that a predetermined gap thickness is maintained from one cartridge to the next without the need for any gap adjustment.

It is still another object of the present invention to provide a variety of cartridges wherein a different gap thickness is achieved with each cartridge.

Another object of the present invention is to decrease the blade replacement time and difficulty from the present state of the art.

To achieve these and other objects a cutting head assembly for use with a centrifugal type slicer is provided comprising a plurality of shoes presenting a leading and a trailing portion. A blade cartridge holding assembly is attached to the trailing portion of one shoe and the leading portion of an adjacent shoe and a blade cartridge is slidably engaged within the holding assembly such that a predetermined gap is formed between the blade cartridge and the trailing portion of an adjacent shoe. Such construction allows a blade to be replaced simply by slidably removing an old blade cartridge and slidably inserting a new blade cartridge.

BRIEF DESCRIPTION OF THE DRAWINGS

These and other features of the present invention will be more fully disclosed in the following DESCRIPTION OF THE PREFERRED EMBODIMENT in which like numerals represent like elements and in which:

FIG. 1 is a perspective view of the cutting edge portion of the preferred blade cartridge in accordance with the present invention;

FIG. 2 is a perspective view of the blade cartridge from the rear;

FIG. 3 is a cross-sectional view of the blade cartridge taken along line 3—3 of FIG. 2;

FIG. 4 is a cross-sectional view of the blade cartridge taken along line 4—4 of FIG. 2;

FIG. 6 is a perspective view of a retaining cap from the inner side;

FIG. 7 is a perspective view of the blade cartridge retaining cap showing the impeller side;

FIG. 8 is a top view of the blade cartridge retaining cap taken along line 8—8 of FIG. 6;

FIG. 9 is a perspective view of a head block illustrating the outside portion;

FIG. 10 is a perspective view of the head block illustrating the impeller side;

FIG. 11 is a top view of the head block taken along line 11—11 of FIG. 9;

FIG. 12 is a cross-sectional view of the head block taken along line 12—12 of FIG. 9;

FIG. 13 is a top view of the cutting head assembly;

FIG. 18 is an impeller-side elevation of an integral blade block and sand gate in accordance with an alternate embodiment of the present invention;

FIG. 19 is a side elevation of FIG. 18;

FIG. 20 is an outer-side elevation of the integral blade block and sand gate; and FIG. 21 is a cross-section of the integral blade block and sand gate taken along line 21—21 of FIG. 18.

FIG. 22 is a fragmentary cross-sectional view of another alternate embodiment of the present invention, including a blade and compatible head block assembly.

FIGS. 23–25 are cross-sectional views of other alternate embodiments of inventive blades in accordance with the present invention.

DESCRIPTION OF THE PREFERRED EMBODIMENT

Figure 5:
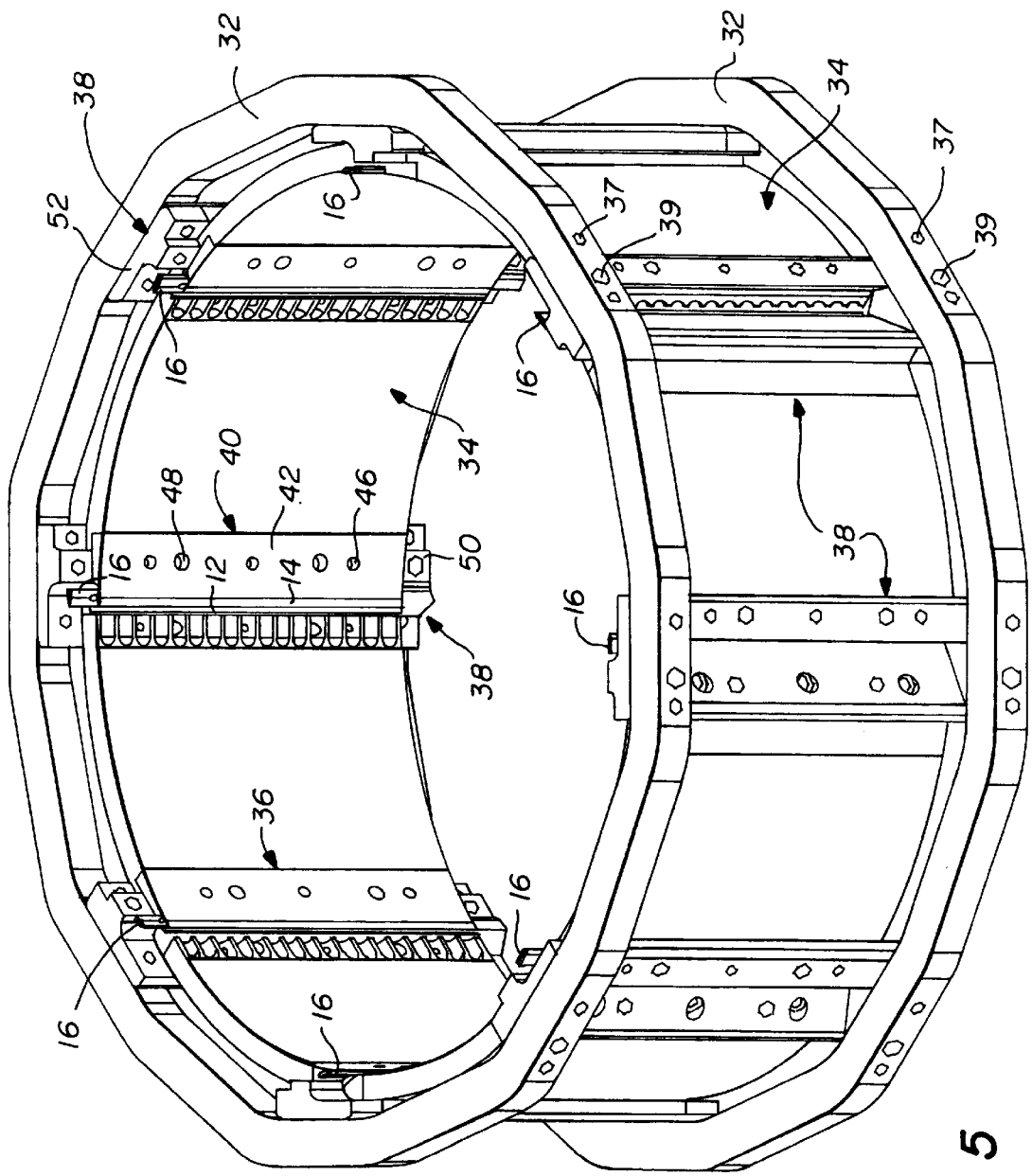
FIG. 5 is a perspective view of a cutting head assembly in accordance with the present invention.

FIGS. 1 and 2 show a replaceable blade cartridge 10 in accordance with the present invention. The cartridge 10 includes a blade 12, a casing 14, and a pull tab 16. The casing 14 and pull tab 16 are preferably formed of molded plastic and substantially surround the blade 12 except for a cutting edge portion 18. Holes 20 and notched portion 22 are formed during molding of the casing and have no utility in the use of cartridge 10.

FIG. 3 is a cross-sectional view of the pull tab 16 area of cartridge 10 taken along line 3—3 of FIG. 2. The pull tab 16 has a cross-sectional shape that prevents cartridge 10 from sliding completely within its head block assembly (described below). FIG. 4 is a cross-sectional view of the main body of cartridge 10 taken along line 4—4 of FIG. 2. The casing 14 has a cross-sectional shape which is slidably engaged within the head block assembly. Casing 14 forms two notches 24 and 26 with notch 26 formed closer to cutting edge portion 18 than notch 24. Notch 24 is on the impeller side of cartridge 10. Casing 14 also includes a flanged portion 28 that functions as a key such that cartridge 10 can be inserted into the head block assembly in only one direction. Flanged portion 28 also prevents the casing 14 from slipping out of the head block assembly. The portion of casing 14 between the notches 24 and 26 and cutting edge 18 needs to be substantial enough to prevent blade 12 from bending an unacceptable amount when slicing potatoes or other food stuffs.

FIG. 5 illustrates a complete cutting head assembly 30 in accordance with the present invention. The head assembly 30 is preferably used with a centrifugal type slicer such as the Urschell Model CC referred to above. The unitary head assembly 30 shown in FIG. 5 includes cartridge 10, upper and lower support rings 32, shoes 34, and head block assemblies 36 rigidly assembled to each other. Each assembly 36 includes a head block 38 and a retaining cap 40 forming a blade holding device. Support rings 32 are pinned and rigidly bolted to each head block 38 at holes 39. As can be seen, the support rings 32 are preferably 16 sided for an eight blade cutting head assembly as shown. Each shoe 34 is pinned and rigidly bolted to a head block 38 at opposing ends. Therefore, it can be seen that there are no rotating or moveable parts in the inventive cutting head assembly 30, which provides the great advantage of eliminating the need for adjusting the gap between each shoe as required heretofore.

Retaining cap 40, shown in FIGS. 6–8, is bolted onto head block 38 to form a slot that slidably engages casing 14 and holds cartridge 10 securely in place. Retaining cap 40 has a somewhat wedge shaped cross-sectional area, as shown in FIG. 8, and presents a surface 42 that is slightly concaved to match the curve of shoes 34. Surface 42 faces the impeller of the slicer used with cutting head assembly 30. Cap 40 also includes a notched portion 44 such that when cap 40 is attached to head block 38, it will abut notch 24 of cartridge 10, shown in FIG. 4. Three bolt holes 46 and two pin holes 48 allow cap 40 to be accurately positioned and attached to head block 38.

Head block 38, shown in FIGS. 9-12, includes a base 50, a top portion 52, a side portion 54 and a cartridge holding portion 56 including a retention finger 58. A slot 60 is formed between portions 54 and 56 through which the potato slices pass. As best seen in FIGS. 9 and 10, orifices 62 and 63 are provided in base 50 and top 52 which mate with orifices 37 and 39 in rings 32 to allow head blocks 38 to be pinned and bolted to rings 32. Orifices 64 and 65 mate with holes in a trailing portion of shoes 34 to allow a shoe to be pinned and bolted to each head block 38. Holding portion 56 includes countersunk bolt holes 66 and pin holes 68 that mate with orifices 46 and 48, respectively, of retaining cap 40. When cap 40 is pinned and bolted to holding portion 56, a notched area 69 will hold a leading portion of a shoe 34.

In this manner a leading portion of one shoe 34 and a trailing portion of an adjacent shoe 34 are held by each head block 38 to form a complete head assembly 30, as shown in FIG. 13. An arrow 70 indicates the rotational direction of a standard impeller of the centrifugal type slicer that forces the potatoes into contact with each stationary blade cartridge 10 to produce potato slices that pass through slot 60.

It is desirable to make the cutting head assembly 30 as versatile as possible and toward this end it would be advantageous to be able to produce a variety of slice thicknesses. This is because, for various reasons, one may want a thicker or thinner slice than previously produced or another vegetable requiring a different slice thickness may be processed with the same assembly 30. In order to easily accomplish this task the blades 12 need to be adjusted quickly and accurately to change the gap thickness defined by blade 12 and sand gate 78. With the present invention the gap thickness is changed by simply inserting a different cartridge 10 into the block head assembly 36 that creates the acceptable gap. A predetermined gap thickness, and therefore the potato slice thickness, can be changed by molding blade 12 closer to one side of casing 14 than another. For example, if blade 12 were positioned within casing 14 closer to notch 24 this would result in a greater slice thickness. In this way it would be easy to form casings 14 in a color code scheme so that an operator could easily identify which cartridge 10 would produce a given slice thickness. To replace a cartridge 10 an operator simply grasps pull tab 16 and pulls the cartridge from slot 72 and inserts a new cartridge. There are no tools needed nor is there a need for any adjustments to be made to the cutting head assembly 30.

Figure 14:
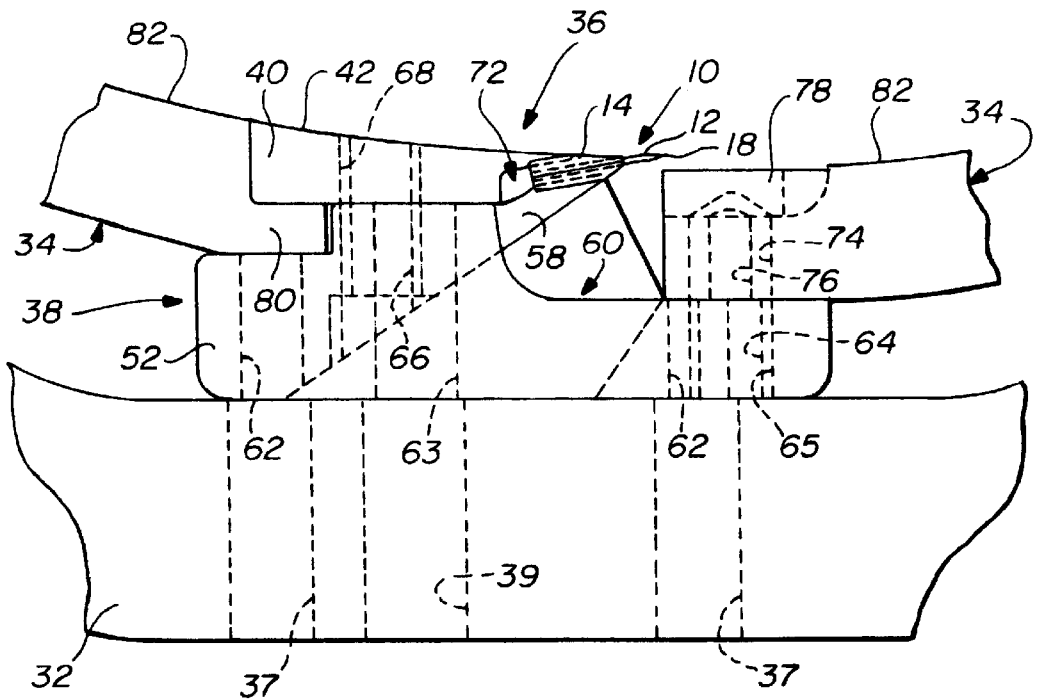
FIG. 14 is a fragmentary view of FIG. 13 detailing the blade cartridge inserted in the head block assembly.
Figure 15:
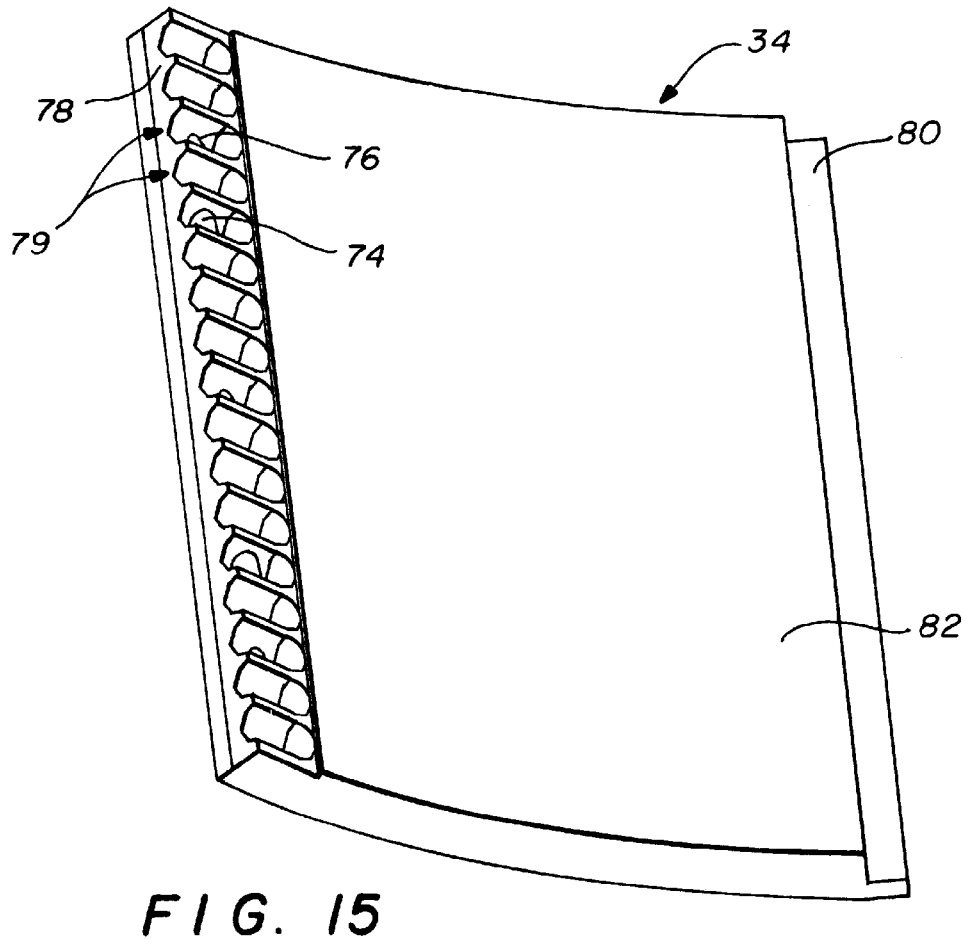
FIG. 15 is a perspective view of a shoe in accordance with the present invention.

FIG. 14 is a fragmentary view of a portion of FIG. 13 detailing a head block assembly 36. As can be seen head block 38 is disposed between ring 32 and shoes 34. Retaining cap 40 is attached to head block 38 to form a slot 72 into which cartridge 10 is fitted as shown. A trailing portion of a shoe 34 is attached to head block 38 by aligning holes 74 and 76 with holes 64 and 65, respectively. Preferably, the trailing portion of each shoe includes a sand gate 78 the purpose of which is to allow sand, dirt, and other debris on the potatoes to fall into a plurality of wells 79 in sand gate 78. This significantly reduces damage to the blade 12 and head block assembly 36. As those skilled in the art are aware the sand gate 78 may be integral to the shoe 34, as shown in FIG. 14, or it can be a separate part and removably attached to shoe 34 (not shown). As seen in FIGS. 14, 15, 16, and 17, a leading portion of each shoe 34 is formed with a tooth 80 that is held between head block 38 and retaining cap 40. Shoe 34 preferably includes a curved inner surface 82 that faces toward the slicer impeller. The curve of surface 82 facilitates forcing a potato against the shoe during slicing operations to provide consistent slice thicknesses.

Figure 14A:
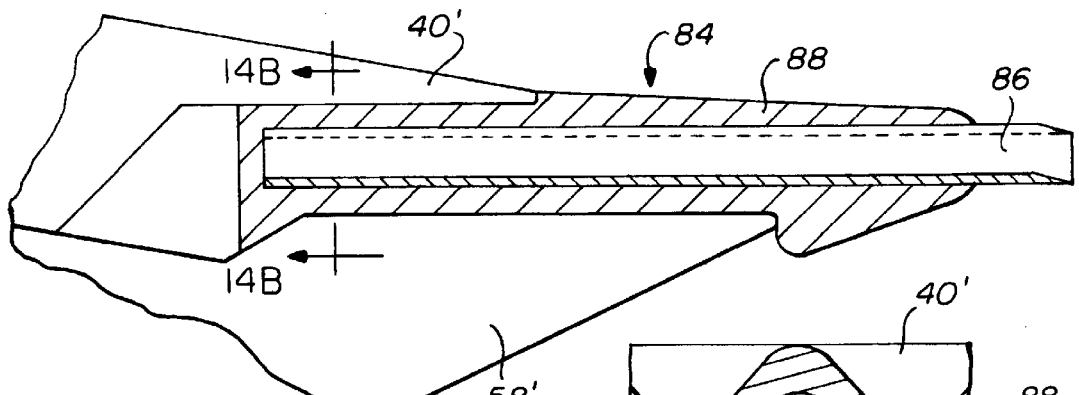
FIG. 14A is a fragmentary cross-sectional view of a wave-shaped blade cartridge held between a head block and retaining cap.
Figure 14B:
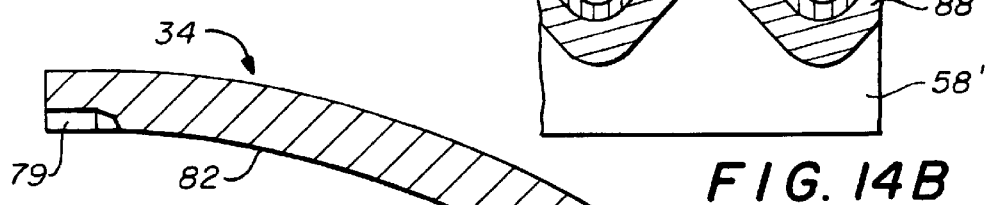
FIG. 14B is a cross-sectional view of the wave-shape cartridge taken along line 14—14 of FIG. 14A.
Figure 17:
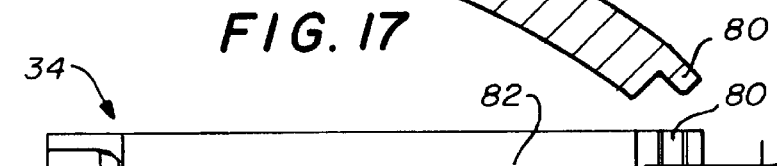
FIG. 17 is a cross-sectional view of the shoe taken along line 17—17 of FIG. 16.
Figure 16:
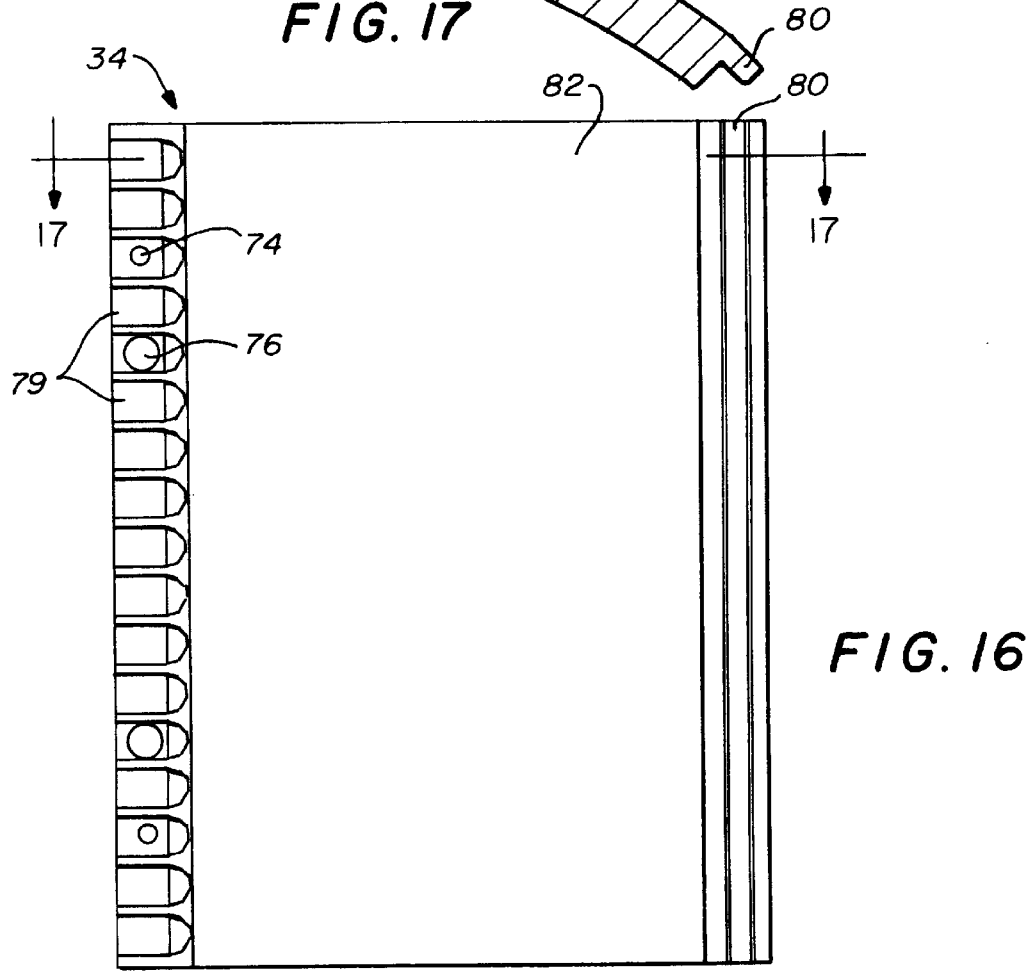
FIG. 16 is a front view of the shoe.

FIGS. 14A and 14B illustrate a preferred embodiment for a wave-shaped blade cartridge 84. Cartridge 84 is essentially the same as cartridge 10 above except a blade 86 has a wave-shaped profile, as shown in FIG. 14B. Blade 86 is substantially surrounded by a molded casing 88. The cross-sectional shape of casing 88 is similar to casing 14. The major difference is that cartridge 84 must necessarily be wider to accommodate the wave-shaped blade 86 compared to cartridge 10. Cartridge 84 is held in place between a retaining cap 40' and a retention finger 58' similarly to cartridge 10. As those skilled in the art will appreciate, a shoe (not shown) used with cartridge 84 should, preferably, be formed with ridges generally conforming to the wave-shape of blade 86. This is to maintain the potato in alignment during slicing so that uniformly ridged potato slices are produced. As those skilled in the art will appreciate, the same slice assembly can be used to produce shredded slices or other cut thicknesses of vegetables, nuts, and fruit.

FIGS. 18–21 disclose another embodiment of the present invention. A cartridge with an integral blade holder and sand gate is shown generally at 90. This embodiment is similar to the invention described above in that no time consuming and difficult gap adjustments are necessary; but this embodiment differs from that above in that conventional blades are used and must be clamped in place with a clamp and bolts. The cartridge 90 is adapted to be attached to a conventional cutting head assembly to eliminate the need for any gap thickness adjustments. This is accomplished because a predetermined gap 92 is provided between the blade holder portion 94 and sand gate portion 96. This ensures that each potato slice will always be of a predetermined thickness. Cartridge 90 functions in all other material respects as a conventional blade holder. Cartridge 90 is connected to a leading portion of a conventional shoe (not shown) through bolt holes 98 and to a trailing portion of an adjacent shoe through bolt holes 100. A conventional blade 102 is then placed on inclined surface 104 over locating pins 106 and held in place by a clamp 108 and bolts 110 that are received through holes 112. Then as the slicer impeller is rotated potato slices pass through gap 92. As best seen in FIG. 21, cartridge 90 preferably presents a curved surface 114 that faces the impeller to promote more consistent potato slices.

Still another embodiment of the present invention is disclosed in FIGS. 22–25. A blade 116, shown in FIG. 22 in cross-section, is slidably held within a slot 118 defined by retaining cap 120 and a head block 122. This configuration is similar to that described above in connection with cartridge 10 except that the blade 116 itself provides the keying, shown generally at 124, to hold the blade in slot 118. Blade 116 has a generally V-shaped keyed area 124 but many other keying configurations could be used. Some other embodiments are shown in FIGS. 23–25. These include a blade 126 in FIG. 23, presenting a notch 128, that would slidably fit within a slot defined by a compatible retaining cap and head block (not shown). Similarly, the blade 130 and its rounded key area 132, shown in FIG. 24, and the blade 134 and its L-shaped key area 136 would slidably fit within retaining caps and head blocks constructed to accommodate the particular keying scheme used. These are but a few examples of possible keying configurations that could be employed to hold blades in place during use and to ensure their proper insertion into their respective cutting head assemblies.

Thus there has been shown a novel blade cartridge and compatible head block assembly that allows an old blade cartridge to be slidably removed and a new blade slidably inserted into a slot in the compatible head block assembly. The novel cutting head assembly disclosed herein has no moving or pivoting parts that would allow the slice gap thickness to materially change. There is no need for tools or for any adjustments to be made to the disclosed novel cutting head assembly as required by conventional assemblies. Also, disclosed is an alternate cartridge that presents an integral blade holder and sand gate to provide a constant non-variable gap. This alternate cartridge is adaptable to conventional cutting head assemblies and uses conventional blades.

As those skilled in the art will appreciate, it is noted that substitutions may be made for the preferred embodiment and equivalents employed herein without departing from the scope of the present invention as recited in the claims. For example, alternative cross-sectional shapes could be employed for the blade cartridge. Also, various other means could be employed to hold the blade cartridge in place.

What is claimed is:

1. An annular cutting head assembly having an inside and an outside and for use with a centrifugal type slicer located on said inside of said cutting head assembly for slicing selected products received on said inside of said cutting head assembly, said cutting head assembly comprising:

a plurality of shoes each presenting a leading and a trailing portion;

a plurality of head block assemblies each rigidly attached respectively to the trailing portion of one of said shoes and to the leading portion of an adjacent one of said shoes, each head block assembly defining a passage therethrough for passing slices of said selected products from said inside to said outside of said cutting head assembly and further presenting structure defining a blade slot having a predetermined cross-sectional area; and an elongated blade having a cutting edge, said blade slidably disposed in said blade slot for slidable removal therefrom, said cutting edge of said blade exposed on said inside of said cutting head assembly and extending along said passage and along the trailing portion of the corresponding adjacent shoe for slicing said selected products, and said blade having a cross-sectional configuration that matches the cross-sectional area of said blade slot in said head block assembly such that a predetermined gap is maintained between the cutting edge of said blade and the trailing portion of the corresponding adjacent shoe without any adjustment to the cutting head assembly, whereby said predetermined gap provides for a constant slice thickness of said selected products.

* * * * *